United States Patent
Askew

[11] 3,789,578
[45] Feb. 5, 1974

[54] HOT PROCESS UNIT
[75] Inventor: Anthony A. Askew, Cornwells Heights, Pa.
[73] Assignee: Ecodyne Corporation, Chicago, Ill.
[22] Filed: May 15, 1972
[21] Appl. No.: 253,089

[52] U.S. Cl.............................. 55/39, 55/54, 55/164, 55/198
[51] Int. Cl............................................. B01d 19/00
[58] Field of Search ......... 55/39, 54, 160, 164, 198; 210/26

[56] References Cited
UNITED STATES PATENTS
| | | | |
|---|---|---|---|
| 2,379,753 | 7/1945 | Sebald | 55/198 X |
| 2,671,524 | 3/1954 | Gilwood | 55/39 |
| 2,500,774 | 3/1950 | Sebald | 55/54 |

*Primary Examiner*—Samih N. Zaharna
*Assistant Examiner*—Richard W. Burks

[57] ABSTRACT

A hot process water softener vessel having a combined treated water storage compartment which is sized to store service water and filter backwash water. The treated water from the zeolite filters enters this compartment through a level control valve which has a limit stop associated therewith to limit the flow rate thereinto to the maximum service flow rate plus the backwash refill rate. When a filter is backwashed the level in the compartment falls regardless of service flow and the level control valve opens up to its limit so that the vessel maximum flow cannot be exceeded. The dirty backwash water is returned to a spray space adjacent the vessel inlet having a level controller to close the raw water inlet valve if the returns are greater than the maximum flow set on the level control valve, such that the level in the spray space rises at the rate of bachwash flow minus the maximum flow set on the level control valve.

14 Claims, 1 Drawing Figure

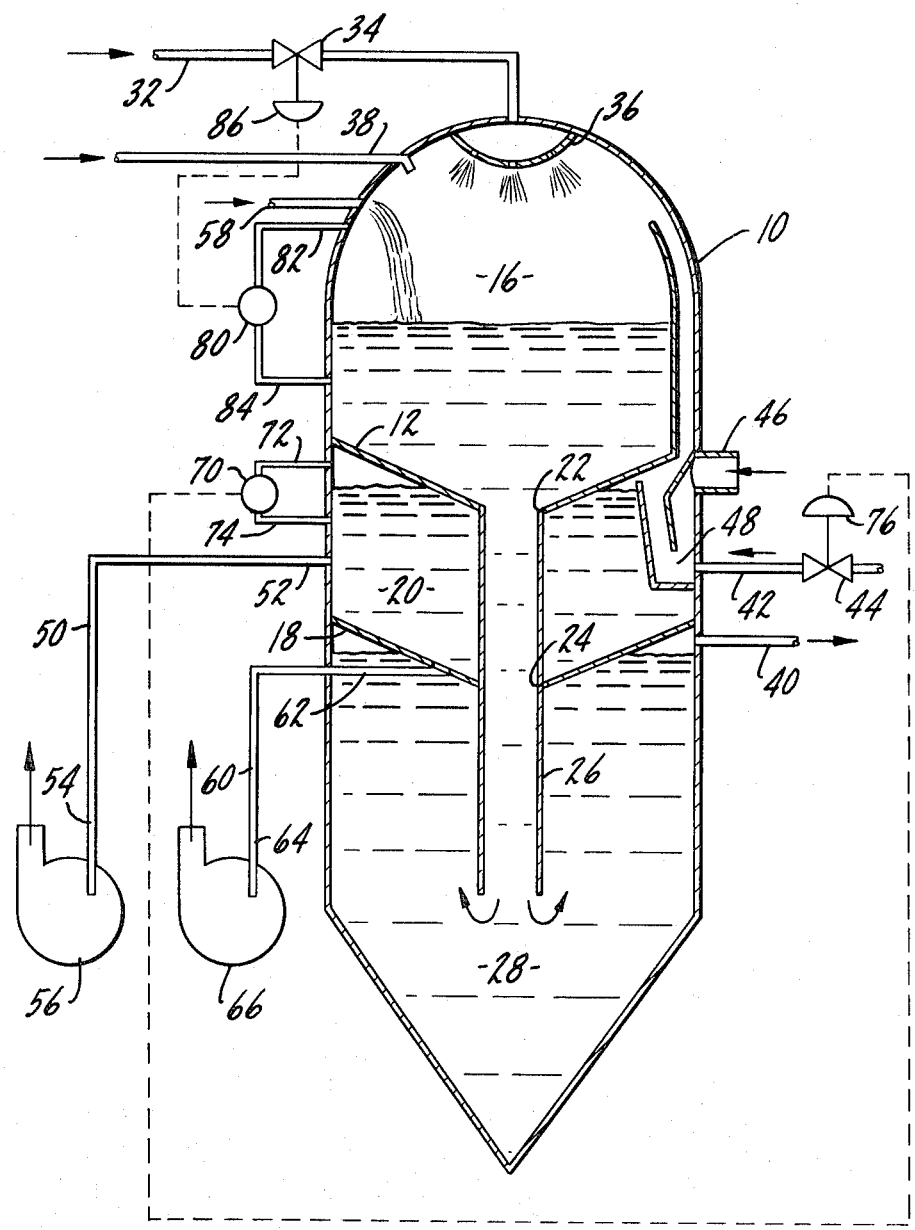

HOT PROCESS UNIT

BACKGROUND OF THE INVENTION

This invention relates to water treating apparatus and more particularly to a hot-process water softener for purification of boiler feed water or water for other uses wherein heated deaerated purified water is required.

The term hot-process softener is used to describe a water treating unit which includes not only reduction of hardness, alkalinity, total solids, but also clarification, heating and deaeration. It is usually followed by filters for complete clarification and zeolite softeners are usually added for further hardness removal, down to zero hardness. A hot-process softener is, consequently, a diversified chemical reaction unit for treating boiler feedwater with chemicals at elevated temperatures. By employing available exhaust steam, at pressures up to 50 psig, the hot-process softener will reduce dissolved and suspended impurities (such as hardness, silica, carbonate, alkalinity, dissolved solids, and oxygen) to the low values required by boilers operating at pressures up to 1,200 psig. Within the confines of a hot-process unit, as many as four or five processes may be going on, some of them simultaneously. All require proper internal unit design for best results.

Most heretofore known hot-process softeners are designed to heat the incoming cold feedwater by intimate contact with steam, followed by mixing with chemicals and preformed sludge or solid precipitates at the top of the softener tank. The mixture is then made to flow downwardly through a small diameter or downcomer to the bottom of the softener tank where it changes direction. After separation of solids, the clear treated water is made to flow upwardly through a sludge bed and/or a deep section of the settling tank volume. This provides maximum solids separation and maximum clarity of treated effluent, which is collected at the top periphery of the settling zone and discharged to the filters and zeolite softeners for final polishing. The polished water is returned to a second-stage deaerating section where the water is made to contact and mix with oxygen-free incoming steam. This mixture then passes up through a baffled compartment in which the water is made to boil and release the last traces of oxygen and other non-condensable gases. This deaerated water is generally directed into a separate compartment for storage prior to being pumped to service.

It has been the heretofore practice to provide a separate backwash storage compartment within the unit to assure availability of an adequate supply of clear filtered water for backwashing filters and zeolite at all times, independent of plant flow or operating conditions. Compartments integral with the softener tank eliminate the need for separate storage facilities. A storage compartment enables the dirty backwash water to be recovered and introduced into a return backwash storage compartment from which it is introduced gradually into the system at a rate which prevents "shocking" the unit. This reduces losses of heat and water in the system, and permits service flow relationship within the unit to continue undisturbed, regardless of operating conditions, and without "surges." While hot-process units of such design have performed well, they have become very complex causing design problems, and fabrication and erection problems, all of which greatly increase the cost of the unit.

The hot-process softener of the present invention provides a unit which eliminates the backwash water storage compartment and the return backwash water storage compartment while still providing an adequate supply of filtered water for backwashing in a manner which permits return of the dirty backwash water into the unit without causing "shocking" or "surges" within the unit.

SUMMARY OF THE INVENTION

It is a primary object of the present invention to provide a hot-process water softener unit that has a selected maximum service flow rate which is not exceeded under all plant flow conditions without the addition of extra compartments for clean and dirty water storage.

Another object is to provide a hot-process water softener unit that includes a single service and backwash water storage compartment which is sized to provide adequate water for service and backwash while maintaining system stability and without causing surges through the main hot-process system.

A further object of the invention is to provide a hot-process water softener unit which supplies backwash water to the filters which has been filtered and deaerated.

A still further object of the invention is to provide a method for treating and degasifying water for use as boiler feedwater makeup in a hot-process softener having a single service and backwash water storage compartment that maintains system stability without causing surges through the system.

The present invention includes a hot process water softener vessel having a combined storage compartment which is sized to store service water and filter backwash water. The treated water from the zeolite filters enters this compartment through a level control valve which has a limit stop associated therewith to limit the flow rate thereinto to the maximum service flow rate plus the backwash refill rate. When a filter is backwashed the level in the compartment falls regardless of service flow and the level control valve opens up to its limit so that the hot-process vessel maximum flow cannot be exceeded. The dirty backwash water is returned to a spray space adjacent the vessel inlet having a level controller to close the raw water inlet valve if the returns are greater than the maximum flow set on the level control valve, such that the level in the spray space rises at the rate of backwash flow minus the maximum flow set on the level control valve. The above mentioned flow rate controls insure that the selected maximum service rate is not exceeded under all plant flow conditions without adding extra compartments for clean and dirty backwash water.

BRIEF DESCRIPTION OF THE DRAWINGS

The exact nature of this invention as well as other objects and advantages therein will be readily apparent form consideration of the following specification relating to the annexed drawing in which:

The single FIGURE is a schematic representation of the hot-process water softener system of the present invention.

DESCRIPTION OF A PREFERRED EMBODIMENT

Referring to the drawing, there is illustrated a hot-process vessel 10 constructed in accordance with the present invention. Vessel 10 includes a partition wall 12 in the form of an inverted truncated cone in which the base of the cone is connected to the inner skin of vessel 10 so as to define an upper mixing chamber 16 thereabove. Positioned below wall 12 and spaced therefrom is a partition wall 18, also in the form of an inverted truncated cone, in which the base of the cone is connected to the inner skin of vessel 10 so as to define a combined service and backwash storage chamber 20 therebetween. The openings 22 and 24 formed at the apices of partition walls 12 and 18 support the upper end of a downwardly extending downcomer tube 26. Downcomer tube 26 provides communication between mixing chamber 16 and a lower treatment chamber 28 defined below partition wall 18.

Water to be treated is supplied through a suitable pipe line 32 and inlet control valve 34 to a diffuser assembly 36 in the top of chamber 16. Associated with diffuser assembly 36 are spray valve heaters (not shown) which permit incoming steam, passing countercurrently from a deaerator chamber 48, to heat the water to within 1° to 3° F of steam temperature. The chemicals (i.e., low-cost lime and magnesium compounds) are fed through pipe line 38 into an initial reaction zone near the water surface, where intimate mixing occurs due to the conical shape of chamber 16. Sludge from the bottom of vessel 10 may be recirculated into the initial reaction zone to speed up chemical reactions by serving as "seed" or nuclei for chemical reactions, producing heavier, more easily settled precipitates for removal in the treatment or settling chamber 28 surrounding downcomer 26.

Agitation results as the water, chemicals and sludge descend to the bottom of the central downcomer 26, where initial separation of solids takes place, the heavier particles dropping to the bottom of chamber 28. The water is then completely clarified by rising at a very low and constant velocity through a deep section of vessel 10 having a uniform cross-section, with precipitated impurities gradually settling out onto the bottom of chamber 28. Sudden changes in load do not affect performance with this type of downcomer design.

Clarified water is withdrawn from an upper portion of chamber 28 through pipe line 40 and sent to filters and zeolite softeners of the type well known in the art, for final polishing. Polished water from the filters and zeolite softeners is returned to baffled deaerator chamber 48 through pipe line 42 having a control valve 44 associated therewith. Oxygen-free steam entering chamber 48 through pipe line 46 is made to contact intimately with the treated, partially deaerated water. The mixture then passes up through a baffle chamber 48, positioned within storage chamber 20, in which the water is made to boil and release the last traces of oxygen and other non-condensable gases which are vented to the atmosphere through a vent (not shown). The treated effluent from deaerator 48 enters storage chamber 20 and the steam passes up through a duct to the top of chamber 16 to heat the water sprayed from assembly 36.

A backwash water pipe line 50 has a first end 52 in communication with a central portion of storage chamber 20 and a second end 54 in communication with the suction end of the backwash pump 56 so that when pump 56 is operating treated and deaerated water will be withdrawn from chamber 20 and pumped to the filters and zeolite softeners for backwashing thereof. The hot return dirty backwash water from the filters and zeolite softeners is returned to the mixing chamber 16 for treatment through pipe line 58 to reduce to a minimum the losses of heat and water in the system.

A boiler feed service pipe line 60 has a first end 62 in communication with a lower portion of storage chamber 20 and a second end 64 in communication with the suction end of the boiler feed pump 66 so that when pump 66 is operating, treated and deaerated water will be withdrawn from chamber 20 and pumped to the boilers.

An important feature of the present invention is the controlled relationship of the flow rates through pipe lines 32, 42, 50, 58, and 60 and the sizing of chambers 16, 20, and 28 to insure that the selected maximum service flow rate is not exceeded and that adequate water for service and backwash in maintained within chamber 20 without causing surges through the system. The treated water level in chamber 20 is controlled by means of a modulated level controlled 70 which is connected to the chamber 20 by means of lines 72 and 74. A supply of air or other control medium under pressure is connected to level controller 70. Compressed air output from controller 70 is controlled in response to the water level in chamber 20 and is connected to a diaphragm control mechanism 76 for controlling the inlet valve 44. This type of level controller mechanism is known in the art and need not be described in detail herein. It is significant to note that the valve 44 is closed down as the level in the chamber 20 increases and is shut off completely when the level in chamber 20 has reached an upper limit as determined by the controller and conversely is fully open when the level has reached a lower limit as determined by the controller. In accordance with the present invention inlet valve 44 has a limit stop associated therewith to limit the flow rate of water from the filters and zeolite softeners therethrough to the service water maximum flow rate through pipe 60 plus the backwash refill rate of the system. Chamber 20 is sized to store enough water supply for approximately 5 minutes service and 10 minutes filter backwash. When a filter or zeolite softener is backwashed the water level in chamber 20 falls regardless of service flow opening valve 44 to its limit thus preventing the hot process maximum flow from being exceeded.

The water level within mixing chamber 16 is controlled by means of a modulated level controller 80, of the same type as controller 70, which is connected to the chamber 16 by means of lines 82 and 84. The compressed air output from controller 80 is controlled in response to the water level in chamber 16 and is connected to a diaphragm control mechanism 86 for controlling the raw water inlet control valve 34. Valve 34 is closed down as the level in the chamber 16 increases and is shut off completely when the level in chamber 16 has reached an upper limit as determined by the controller and conversely is fully open when the level has reached a lower limit as determined by the controller. In accordance with the present invention level controller 80 is effective to close raw water inlet control valve 34 when the flow rate of return backwash water through pipe line 58 into chamber 16 is greater than the limit stop flow rate on control valve 44 so that the level in chamber 16 rises at the rate of the difference between the backwash flow rate and the limit stop flow rate on control valve 44. Chamber 28 must be sized to hold at least a volume of water equal to the difference between the volumes required for backwash and service for 10 minutes.

In describing the operation of the present invention, an exemplary system is disclosed to more clearly bring out the significance of the hereinabove mentioned flow rate controls. The exemplary system is designed to provide 250 gpm service flow to the boilers and 300 gpm backwash flow to the filters and zeolite softeners. During the service cycle, raw water enters vessel 10 through pipe 32 and control 34 at substantially the same rate as polished, deaerated water is pumped from chamber 20 through pipe 60 to the boilers, e.g., 250 gpm. The raw water passes through diffuser assembly 36 where it is heated by incoming steam to within 1° to 3° F of steam temperature. The heated water falls into an initial reaction zone in chamber 16 where it is mixed with incoming chemicals fed in through pipe 38. The chemically treated water descends to the bottom of downcomer 26 into the bottom of chamber 28 where the water is completely clarified by rising at a very low and constant velocity through chamber 28. The clarified water is withdrawn from an upper portion of chamber 28 through pipe 40 at 250 gpm and sent to the filters and zeolite softeners for polishing. The polished water from the filters passes through control valve 44 and pipe 42 into deaerator chamber 48 at the same 250 gpm rate. The polished water is deaerated in chamber 48 by intimate contact with incoming steam and then returned to storage chamber 20 at a 250 gpm rate.

Thus, during a service cycle in which no backwashing is taking place and storage chamber 20 is not refilling from the previous backwashing cycle, the control valves 34 and 44 are respectively controlled by level controllers 80 and 70 to permit a system flow rate of 250 gpm while maintaining equalibrium throughout the system.

During the backwash cycle of the exemplary system, polished deaerated water from chamber 20 is withdrawn through pipe 60 at a rate of 250 gpm and through pipe 50 at a rate of 300 gpm. The dirty backwash water from the filters is returned to chamber 16 through pipe 58 at a rate of 300 gpm. The withdrawal of 550 gpm from chamber 20 causes level controller 70 to open control valve 44 to it limit stop of 275 gpm (250 gpm service flow plus a designed refill rate of 25 gpm). Since the dirty backwash water returns (300 gpm) are greater than the limit stop on valve 44 (275 gpm), the level controller 80 is effective to close off flow of raw water through valve 34. Since during this cycle the level in chamber 20 is falling at a rate of 275 gpm (550 gpm-275 gpm), chamber 20 must be sized to accommodate such flow during the backwash cycle without exhausting the water stored therein. Also, chamber 16 must be sized to accommodate the level rise caused therein of 25 gpm (300 gpm-275 gpm) caused by the return of dirty backwash water thereinto.

Upon completion of the backwash cycle, the water withdrawal rate from chamber 20 returns to 250 gpm while the water which is added thereto remains at 275 gpm until the level in chamber 20 reaches its upper limit, whereupon level controller 70 reduces the flow rate through valve 44 to 250 gpm. Similarly, level controller 80 controls valve 34 so as to reopen flow therethrough when the flow rate of backwash return through pipe 58 falls below the limit stop rate of valve 34. The level controllers 70 and 80 then control the flow respectively through control valves 44 and 34 to maintain the respective levels in chambers 20 and 16 near their upper limits.

Another feature of the present invention is the elevations of backwash pipe 50 and service pipe 60 within chamber 20. Backwash pipe 50 suctions water from an upper portion of chamber 20 and service pipe 60 suctions water from a lower portion of chamber 20. The upper portion of chamber 20 must be of sufficient volume to hold at least 10 minutes backwash water and the lower portion must be of sufficient volume to hold at least 5 minutes service water. This elevational relationship between pipes 50 and 60 prevents taking water from the boiler feed storage to backwash the filters.

Suitable valves (not shown) may be provided for controlling the drawing off of the sludge from the bottom of chamber 28. As mentioned above a portion of this sludge may be recirculated to the reaction zone in chamber 16 to facilitate settling of the precipitates.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A method for treating and degasifying water for use as boiler feedwater makeup in a hot-process softener vessel, comprising the steps of:
   a. spraying the raw water to be treated through a steam containing space within a hot-process vessel to heat the water;
   b. delivering the heated water into a mixing chamber within the vessel;
   c. spraying reagent chemicals in finely divided streams into the mixing chamber for mixing with the heated water;
   d. delivering the water and chemical mixture to a treatment chamber within the vessel for settling out precipitated foreign matter;
   e. delivering the treated water from the treatment chamber to further treatment means for final polishing;
   f. returning the polished water from said further treatment means to a deaerating chamber within the vessel for contact with steam so as to release oxygen and other non-condensable gasses; and
   g. delivering the deaerated water from said deaerating chamber to a combined storage chamber within the vessel for selective removal therefrom to supply boiler feedwater makeup and to supply water for backwashing said further treatment means.

2. The method as defined in claim 1 wherein the deaerated water flow into the storage compartment is controlled so as to limit it to the maximum service flow to the boilers plus the backwash refill rate.

3. The method as defined in claim 2 wherein the dirty backwash water is returned to the mixing chamber and the supply of raw water sprayed into the vessel is closed off when the dirty backwash water returns exceed the maximum flow into the storage chamber.

4. The method as defined in claim 3 wherein the storage chamber is sized to hold approximately 5 minutes service water and 10 minutes backwash water.

5. A method for treating and degasifying water for use as boiler feedwater makeup in a hot-process softener vessel, comprising the steps of:

a. spraying the raw water to be treated through a steam containing space within a hot-process vessel to heat the water;
b. delivering the heated water into a mixing chamber within the vessel;
c. spraying reagent chemicals in finely divided streams into the mixing chamber for mixing with the heated water;
d. delivering the water and chemical mixture to a treatment chamber within the vessel for settling out precipitated foreign matter;
e. delivering the treated water from the treatment chamber to further treatment means for final polishing;
f. returning the polished water from said further treatment means to a deaerating chamber within the vessel for contact with steam so as to release oxygen and other non-condensable gasses;
g. delivering the deaerated water from said deaerating chamber to a combined storage chamber within the vessel for selective removal therefrom to supply boiler feedwater makeup and to supply water for backwashing said further treatment means;
h. returning the dirty backwash water from the further treatment means to the mixing chamber;
i. controlling the water level within the storage chamber between an upper limit and a lower limit by changing the flow rate of deaerated water thereinto dependent upon the water level therein, said deaerated water flow rate being limited to the maximum service flow rate to the boilers plus the backwash refill rate; and
j. controlling the water level within the mixing chamber between an upper limit and lower limit by changing the flow rate of raw water thereinto dependent upon the water level therein, said raw water flow rate being closed off when the dirty backwash water returns exceed the maximum deaerated water flow rate.

6. A hot-process water softener including a vessel having a first partition wall positioned within said vessel so as to define a mixing chamber thereabove, said mixing chamber having a first inlet associated therewith for receiving raw water to be treated and a second inlet associated therewith for receiving steam at an upper end thereof, a second partition wall positioned within said vessel so as to define a combined service and backwash water storage chamber between said first partition wall and said second partition wall and a treatment chamber therebelow, a downcomer tube positioned within said vessel so as to permit fluid communication between said mixing chamber and said treatment chamber, a third partition wall positioned within said vessel so as to define a deaerating chamber, said treatment chamber having a first outlet associated therewith through which water is directed to further treatment means, said deaerating chamber having a third inlet associated therewith for receiving treated water from said further treatment means and a fourth inlet associated therewith for receiving steam to be contacted with said treated water for deaeration thereof, said deaerating chamber being in communication with said storage chamber such that treated and deaerated water from said deaerating chamber passes into said storage chamber, said storage chamber having a second outlet associated therewith for directing water therefrom to service and a third outlet associated therewith for directing water therefrom to backwash said further treatment means, and said mixing chamber having a backwash water return inlet associated therewith for returning backwash water from said further treatment means to said mixing chamber.

7. The apparatus as defined in claim 6 wherein said third inlet associated with said deaerating chamber includes a first control valve means for controlling the flow rate therethrough, and said storage chamber includes a first level control means associated therewith for controlling the rate of flow through said first control valve means dependent upon the rate of flow through said second and third storage chamber outlets.

8. The apparatus as defined in claim 7 wherein said first control valve means has a limit stop to limit the flow rate therethrough to the maximum flow rate through said second storage chamber outlet plus the storage chamber refill rate.

9. The apparatus as defined in claim 8 wherein said first inlet includes a second control valve means for controlling the flow rate therethrough, and said mixing chamber includes a second level control means associated therewith for controlling the rate of flow through said second control valve means dependent upon the water level in said mixing chamber.

10. The apparatus as defined in claim 9 wherein said second level control means closes off flow through said second control valve means when the flow rate through said backwash return inlet is greater than the limit stop rate on said first control valve means.

11. The apparatus as defined in claim 10 wherein said storage chamber is sized to store enough water for at least five minutes service and ten minutes backwash.

12. The apparatus as defined in claim 10 wherein said third outlet is positioned adjacent the lower end thereof and said fourth outlet is positioned adjacent an upper portion of said storage chamber so as to prevent removal of water from the service water portion of said storage chamber to backwash said further treatment means.

13. The apparatus as defined in claim 6 wherein said third inlet associated with said deaerating chamber includes a first control valve means for controlling the flow rate therethrough, and said storage chamber includes a first level control means associated therewith for controlling the water level within said storage chamber between an upper limit and a lower limit by changing the flow rate through said first control valve means, said first control valve means having a limit stop to limit the flow rate therethrough to the maximum flow rate through said second storage chamber outlet plus the storage chamber refill rate.

14. The apparatus as defined in claim 13 wherein said first mixing chamber inlet includes a second control valve means for controlling the flow rate therethrough and, said mixing chamber includes a second level control means associated therewith for controlling the water level within said mixing chamber between an upper limit and a lower limit by changing the flow rate through said second control valve means, said second level control means closes off flow through said second control valve means when the flow rate through the backwash return inlet is greater than the limit stop rate on said first control valve means.

* * * * *

PO-1050
(5/69)

UNITED STATES PATENT OFFICE
CERTIFICATE OF CORRECTION

Patent No. 3,789,578　　　　　Dated February 5, 1974

Inventor(s) Anthony A. Askew

It is certified that error appears in the above-identified patent and that said Letters Patent are hereby corrected as shown below:

In column 1, line 32, after "diameter" insert --pipe--.

In column 4, line 17, delete "in" and insert --is--.

In column 4, line 20, delete "controlled" and insert --controller--.

In column 5, line 11, after "control" insert --valve--.

Signed and sealed this 4th day of June 1974.

(SEAL)
Attest:

EDWARD M. FLETCHER, JR.
Attesting Officer

C. MARSHALL DANN
Commissioner of Patents